(No Model.)
C. D. RICE.
METHOD OF REPAIRING PNEUMATIC TIRES.
No. 475,343. Patented May 24, 1892.
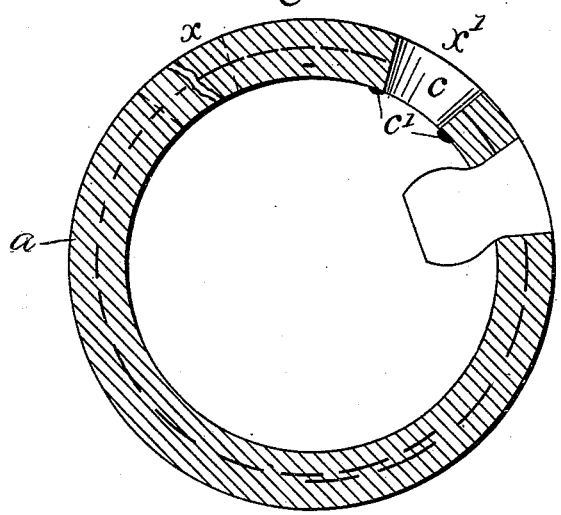
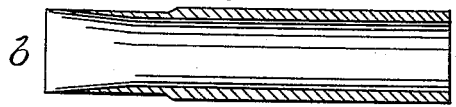
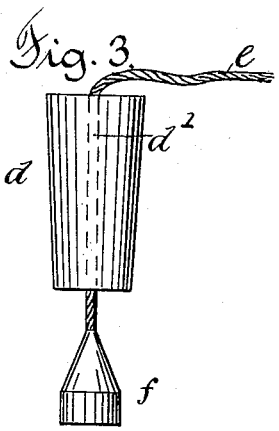
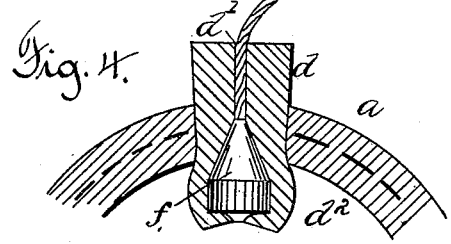
Witnesses
H. F. Gidding
G. B. Jenkins
Inventor
Charles D. Rice,
by Chas. L. Burdett,
Attorney

UNITED STATES PATENT OFFICE.

CHARLES D. RICE, OF HARTFORD, CONNECTICUT, ASSIGNOR TO THE POPE MANUFACTURING COMPANY, OF BOSTON, MASSACHUSETTS.

METHOD OF REPAIRING PNEUMATIC TIRES.

SPECIFICATION forming part of Letters Patent No. 475,343, dated May 24, 1892.

Application filed February 11, 1892. Serial No. 421,140. (No model.)

*To all whom it may concern:*

Be it known that I, CHARLES DE LOS RICE, of Hartford, in the county of Hartford and State of Connecticut, have invented certain new and useful Improvements in Methods of Repairing Pneumatic Tires for Vehicles, of which the following is a full, clear, and exact description, whereby any one skilled in the art can make and use the same.

My invention relates to the general class of air-inflated tires that are used on the wheels of vehicles, and more especially on velocipedes. Such pneumatic tires are commonly made with an outer covering or tread of india-rubber, an inner restraining-sack of canvas or like fabric and an inner inflatable tube, and in some kinds of tires these several elements are more or less intimately united. In the use of such tires one of the most serious objections is the liability to puncture, that enables the air to escape and renders the tire comparatively useless.

The object of my invention is to provide a method of repairing such a punctured tire in a simple and durable manner, and my invention consists in such method as more particularly hereinafter described, and pointed out in the claims.

Referring to the drawings, Figure 1 is a detail view, on enlarged scale in cross-section, of a pneumatic tire, showing at several points the several steps in the method of repair. Fig. 2 is a detail view, in lengthwise central section, of a tubular cutter. Fig. 3 is a detail side view of a plug and expander. Fig. 4 is a detail view, in central section, of the plug and expander shown in place in a tire.

In the accompanying drawings, the letter $a$ denotes a tubular tire made up of a series of layers of india-rubber or like elastic material and a textile fabric, as thin canvas, the latter being preferably more or less intimately united to the rubber within the mass of the wall of the tube. In case such a tire is punctured, as sometimes occurs when the tire is expanded and in use on a wheel, the air escapes with greater or less rapidity, depending on the size of the hole; but in most cases the slightest opening through the wall of the tire is sufficient to allow the air to escape, so as to prevent the tire from being filled to a degree of hardness needed to put it in condition for proper use to obtain the advantages that reside in a properly constructed and filled pneumatic tire.

In the practice of my invention a circular piece of the substance of the tire, including the punctured part, is cut out, as by means of a tubular cutter $b$, and as shown by the dotted lines at $x$ in Fig. 1. By this means a tapered hole $c$ is made in the wall, about as shown at $x'$ in Fig. 1, and a sufficient quantity of liquid rubber or other suitable cement is smeared on the walls of the hole $c$, and particularly about the inner edge of the hole, as indicated at $c'$. To fill this hole, I make use of an elastic plug $d$ made, preferably, of india-rubber and tapered, as shown in Fig. 3, the plug being of proper size to fit snugly into the hole made by the cutter when the outer end projects beyond the surface of the tread. There is a hole $d'$ lengthwise through the center of the plug, and through this a string $e$ extends, an expander $f$ being secured to the inner end of the string. The hole through the plug is made in molding the latter to shape, and it is quite small in size. The expander is small at the upper end and is preferably tapered from a somewhat wide body part to a point small enough to enable the end to enter the hole in the plug somewhat easily. After the plug has been inserted in the hole the expander is pulled up into the body of the plug a sufficient distance to expand it until the hole is very snugly filled and a bulge $d^2$ formed within the hollow tire and close to the inside surface. The cement that has been smeared within the hole and on the plug fills the joint at the inner side of the tire about the plug and securely packs and closes it against any leakage of air, the surface of the plug within the hole also being securely cemented to the wall of the hole that is plugged by it. The inner end of the plug closes upon and behind the expander, so that it is held in place by this contraction of the elastic plug as well as by the cement that glues the string in the hole $d'$. This retention of the expander in place may also be aided, if desired, by providing it with engaging-points to anchor into the walls of the hole $d'$. The projecting outer end of the plug is cut off flush with the surface of the tread, and as soon as the adhesive material used in the repairing has dried, (which should be effected within a few hours,) the tire may be inflated and used, as the plug will be so securely held in the wall of the tire as to form practically an integral part thereof.

My invention is not limited to the use of an elastic plug of india-rubber, although that material is preferred, nor to the use of any particular form of expander, nor means of introducing it, although the form and means shown and described are preferred as having worked well in practical tests made of the invention. Nor is it essential to the embodiment of my invention that the opening in the plug should extend completely therethrough, as a good result can be obtained by making an expander-socket within the substance of the plug and forcing the expander in from either end, and I do not limit myself to the particular construction of the expander-socket that is herein illustrated.

I have found by experiment that it is desirable to provide means for locating the expander within the plug at a certain distance, and this is conveniently done by making a knot in the string that shall serve as a gage-knot, the expander being inserted until this knot is flush with the outer end of the plug. The best position for the expander in any given size of plug or for use with any given thickness of tire may be determined by experiments, and then such gage-knot may be held at a constant distance for that size and kind of tire.

I claim as my invention—

1. The method of repairing pneumatic tires, that consists, first, in forming a plug-socket through the wall of the tire and embracing a punctured part; second, inserting in said hole a plug having an expander-socket, and, third, forcing an expander into the body of the plug and securing the plug in place by means of an adhesive material, as cement, all substantially as described.

2. The method of repairing pneumatic tires for bicycles, that consists, first, in cutting a tapered hole through the wall of the tire and embracing a punctured part; second, smearing the walls of the hole with adhesive material, as rubber cement; third, placing a tapered perforated plug in the plug-socket in the tire; fourth, drawing an expander from within the tire into the substance of the plug by means of a string extending therethrough, and, fifth, trimming off the projecting end of the plug, all substantially as described.

CHARLES D. RICE.

Witnesses:
CHAS. L. BURDETT.
GEO. H. DAY.